United States Patent
Schwartz (10) Patent No.: US 8,645,933 B2
(45) Date of Patent: Feb. 4, 2014

(54) METHOD AND APPARATUS FOR DETECTION AND OPTIMIZATION OF PRESUMABLY PARALLEL PROGRAM REGIONS

(76) Inventor: Leon Schwartz, Palo Alto, CA (US)

( * ) Notice: Subject to any disclaimer, the term of this patent is extended or adjusted under 35 U.S.C. 154(b) by 1479 days.

(21) Appl. No.: 12/313,121

(22) Filed: Nov. 17, 2008

(65) Prior Publication Data

US 2010/0031241 A1 Feb. 4, 2010

Related U.S. Application Data

(60) Provisional application No. 61/085,821, filed on Aug. 1, 2008.

(51) Int. Cl.
  G06F 9/45 (2006.01)
(52) U.S. Cl.
  USPC ........... 717/151; 717/152; 717/155; 717/156; 717/158; 717/159
(58) Field of Classification Search
  USPC .......... 717/151, 152, 155, 156, 158, 159, 160
  See application file for complete search history.

(56) References Cited

U.S. PATENT DOCUMENTS

| | | | | |
|---|---|---|---|---|
| 5,598,561 | A * | 1/1997 | Funaki | 717/149 |
| 6,253,371 | B1 * | 6/2001 | Iwasawa et al. | 717/150 |
| 6,286,130 | B1 * | 9/2001 | Poulsen et al. | 717/119 |
| 6,381,739 | B1 * | 4/2002 | Breternitz et al. | 714/37 |
| 6,708,331 | B1 * | 3/2004 | Schwartz | 717/160 |
| 6,993,753 | B2 * | 1/2006 | Yamanaka et al. | 717/140 |
| 7,590,977 | B2 * | 9/2009 | Archambault et al. | 717/140 |
| 7,673,295 | B1 * | 3/2010 | Lin | 717/156 |
| 7,882,498 | B2 * | 2/2011 | Ottoni et al. | 717/149 |
| 7,962,906 | B2 * | 6/2011 | O'Brien et al. | 717/160 |
| 2002/0042907 | A1 * | 4/2002 | Yamanaka et al. | 717/149 |
| 2003/0097395 | A1 * | 5/2003 | Petersen | 709/102 |
| 2003/0101443 | A1 | 5/2003 | Kosche et al. | |
| 2003/0110481 | A1 * | 6/2003 | Wada et al. | 717/158 |
| 2004/0199919 | A1 * | 10/2004 | Tovinkere | 718/102 |
| 2005/0188364 | A1 * | 8/2005 | Cockx et al. | 717/159 |
| 2006/0010432 | A1 * | 1/2006 | Iwashita | 717/136 |
| 2007/0234276 | A1 * | 10/2007 | Ottoni et al. | 717/104 |
| 2007/0283337 | A1 * | 12/2007 | Kasahara et al. | 717/149 |
| 2008/0127146 | A1 * | 5/2008 | Liao et al. | 717/150 |
| 2008/0301677 | A1 * | 12/2008 | Park et al. | 718/100 |
| 2009/0307673 | A1 * | 12/2009 | Eichenberger et al. | 717/160 |
| 2010/0011339 | A1 * | 1/2010 | Eichenberger et al. | 717/106 |
| 2010/0218196 | A1 * | 8/2010 | Leung et al. | 718/107 |
| 2011/0131559 | A1 * | 6/2011 | Young et al. | 717/145 |
| 2012/0192193 | A1 * | 7/2012 | Barsness et al. | 718/102 |

OTHER PUBLICATIONS

International Search Report and Written Opinion mailed Jan. 29, 2010 for Application No. PCT/US2009/052571.

(Continued)

*Primary Examiner* — Qamrun Nahar
(74) *Attorney, Agent, or Firm* — Moser Taboada (57) ABSTRACT

A method and apparatus for optimizing source code for use in a parallel computing environment by compiling an application source code, performing analysis, and optimizing the application source code. At the time of compilation, a compiler adds instrumentation to a prepared executable. An analysis program then analyzes the prepared executable and generates an analysis result. The analysis result is then used by the analysis program to optimize the application source code for parallel processing.

19 Claims, 4 Drawing Sheets

(56) References Cited

OTHER PUBLICATIONS

Intel Corporation, "Intel C++ Complier Optimizing Applications", Document No. 30776-003US, Copyright 1996-2006, http://software.intel.com/file/6396, pp. 1-231.

Lobo, Sheldon, "The Sun Studio Binary Code Optimizer", http://developers.sun/com/solaris/articles/binopt.html, Nov. 30, 2005, pp. 1-6.

Balakrishnan, Gogul and Reps, Thomas, "Analyzing Memory Accesses in x86 Executables," 2004, pp. 1-20.

Chapman, Barbara et al., "Using OpenMP—Portable Shared Memory Parallel Progamming," 2008.

Dorta, Antonio J. et al., "The OpenMP Source Code Repository: an Infrastructure to Contribute to the Development of OpenMP," Proc. of the 6th European Workshop on OpenMP (EWOMP 2004), pp. 57-62, Stockholm, Sweden, Oct. 2004.

Ding, Chen and Zhong, Yutao, "Compiler-Directed Run-Time Monitoring of Program Data Access," 2002.

Hoeflinger, Jay Philip, "Interprocedural Parallelization Using Memory Classification Analysis," Ph.D. Thesis, University of Illinois at Urbana-Champaign, 1998, Copyright by Jay Philip Hoeflinger 2000.

"DWARF Debugging Information Format," Technical Report, UNIX International, Programming Languages SIG, Revision: 2.0.0, Jul. 27, 1993.

Moseley, Tipp et al., "Identifying Potential Parallelism via Loop-centric Profiling," Proceedings of the 2007 Conference on Computing Frontiers (CF'07), Iscia, Italy, May 7-9, 2007.

Nethercote, Nicholas, "Dynamic Binary Analysis and Instrumentation or Building Tools is Easy," Ph.D. Thesis, Computer Laboratory, University of Cambridge, United Kingdom, Nov. 2004.

Nethercote, Nicholas and Seward, Julian, "Valgrind: A Framework for Heavyweight Dynamic Binary Instrumentation," Proceedings of ACM Sigplan 2007 Conference on Programming Language Design and Implementation (PLDI'07), San Diego, California, Jun. 11-13, 2007.

Ramalingam, G., et al. "Aggregate Structure Identification and its Application to Program Analysis," Symposium on Principles of Programming Languages, 1999.

Seward, Julian and Nethercote, Nicholas, "Using Valgrind to detect undefined value errors with bit-precision," Proceedings of the 2005 USENIX Annual Technical Conference, Anaheim, California, Apr. 2005, pp. 17-30.

Seidl, Matthew L. et al., "Implementing Heap-Object Behavior Prediction Efficiently and Effectively," University of Colorado at Boulder, Technical Report CU-CS-893-99, Dec. 1999.

Tubella, Jordi and González, Antonio, "Control Speculation in Multithreaded Processors through Dynamic Loop Detection," HPCA, 1998.

Yu, Hao and Rauchwerger, Lawrence, "Techniques for Reducing the Overhead of Run-Time Parallelization," Computational Complexity, 2000.

Zhong, Yutao et al., "Miss Rate Prediction across All Program Inputs," 2003, pp. 1-12.

Cohn, David A. and Singh, Satinder, "Predicting Lifetimes in Dynamically Allocated Memory," Advances in Neural Information Processing Systems 9, 1996.

Paek, Yunheung et al., "Simplification of Array Access Patterns for Compiler Optimizations," ACM Sigplan Notices, v. 33 n. 5, May 1998.

McLendon III, William and Rauchwerger, Lawrence, "Speculative Parallelization of Partially Parallel Loops," Technical Report 00-015, Department of Computer Science, Texas A&M University, May 16, 2000.

Eager, Michael J., "Introduction to the DWARF Debugging Format," Wikipedia, Feb. 2007, pp. 1-10.

\* cited by examiner

METHOD AND APPARATUS FOR DETECTION AND OPTIMIZATION OF PRESUMABLY PARALLEL PROGRAM REGIONS

CROSS-REFERENCE TO RELATED APPLICATIONS

This application claims benefit of U.S. provisional patent application Ser. No. 61/085,821, filed Aug. 1, 2008, which is herein incorporated by reference.

BACKGROUND OF THE INVENTION

1. Field of the Invention

Embodiments of the present invention generally relate to binary code instrumentation and program parallelization and, more specifically, to a method and apparatus for automatic parallelization of certain program regions using a collection of analysis techniques.

2. Description of the Related Art

Over the last decade, a new standard for expressing parallelism has emerged. The OpenMP committee (www.openmp.org) has created special annotations for expressing the notion that a certain region or regions of a computer program may be executed in parallel. These annotations also provide a means to describe the ways in which program memory is used, so that parallel threads of execution can avoid interfering with one another.

Since modern compilers support this standard, modern computer systems are multiprocessing, and sequential computer applications include non-trivial amounts of implicit parallelism, one would expect the usage of these annotations to be widespread. Unfortunately, this is not yet possible because they can currently only be written by someone possessing a fair amount of expertise in the semantics of parallel execution, together with a fairly intimate knowledge of the application source.

Today's parallelizing compilers are generally built using techniques of static analysis, and, in particular, abstract interpretation. The goal of abstract interpretation is to prove something about all possible program runs. However, it is not currently possible to prove many interesting properties about today's applications due to their vast complexity. In fact, most parallelizing compilers cannot decide whether any interprocedural region is parallel, and must therefore fail to parallelize important program loops which may be parallel For the purpose of parallelization, it is less important to prove that a property holds for all possible program runs than to prove that it holds for all "interesting" program runs. This is in contrast to, say, a safety analysis, where because the goal of the analysis is to verify that a property holds for all program runs, every possible run is "interesting". A reasonable assumption about the predictability of memory access patterns can help to discover and exploit presumably parallel regions.

Therefore, there is a need in the art for a method and apparatus to determine where such presumably parallel regions occur and to optimize applications to exploit such regions.

SUMMARY OF THE INVENTION

The present invention generally relates to a method and apparatus for optimizing source code for use in a parallel computing environment. The method comprises compiling an application source code, performing an analysis, and optimizing application source code. At the time of compilation, the compiler adds instrumentation to a prepared executable. An analysis program then analyzes the prepared executable and generates an analysis result. The analysis result is then used by the analysis program to optimize the application source code file for parallel processing.

The apparatus comprises a computer readable storage medium comprising software that, when executed by a processor, causes the processor to perform a method comprising compiling an application source code, performing analysis, and optimizing the application source code. At the time of compilation, the compiler adds instrumentation to a prepared executable. An analysis program then analyzes the prepared executable and generates an analysis result. The analysis result is then used by the analysis program to optimize the application source code for parallel processing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The drawings have been simplified for clarity and are not drawn to scale. To facilitate understanding, identical reference numerals have been used, wherever possible, to designate identical elements that are common to the figures. It is contemplated that some elements of one embodiment may be beneficially incorporated in other embodiments.

DETAILED DESCRIPTION

A method and apparatus for optimizing binary code for parallel processing is described herein. The inventive method and apparatus advantageously provides a way to optimize software for execution on parallel computing platforms even when it is not possible to abstractly prove certain regions may be executed in parallel.

Figure 1:
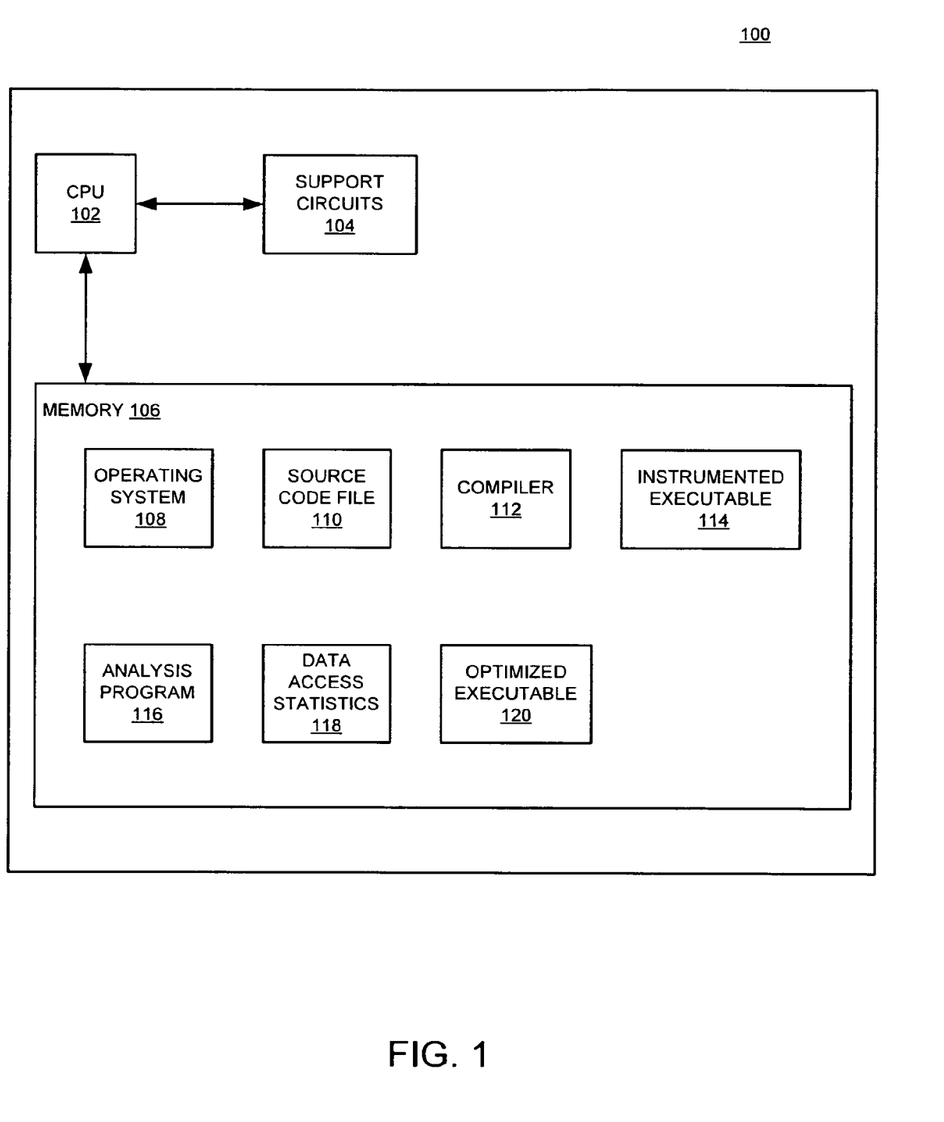
FIG. 1 is a block diagram depicting an exemplary computer executing an embodiment of the present invention.

FIG. 1 is a block diagram depicting a computer 100 executing an embodiment of the present invention. The computer 100 generally comprises a computing device such as those generally known in the art. The computer 100 includes a central processing unit (CPU) 102, support circuits 104, and memory 106. The CPU 102 may comprise one or more commercially available microprocessors or microcontrollers that facilitate data processing and storage. The various support circuits 104 are utilized to facilitate the operation of the CPU 102 and include such circuits as clock circuits, power supplies, cache, input/output circuits, and the like. The memory 106 may comprise random access memory, read only memory, removable storage, optical disk storage, disk drive storage, and combinations thereof. The memory 106 stores an operating system 108, a source code file 110, a compiler 112, an instrumented executable 114, an analysis program 116, a set of data access statistics 118, and an optimized executable 120. In operation, the CPU 102 executes the operating system 108 to control the general utilization and functionality of the computer 100.

The CPU 102 also executes the compiler 112. The compiler 112 takes the source code file 110 and converts it into machine readable instructions embodied in an instrumented executable 114. The source code file 110 represents any program file where it is possible to infer dynamic loop structure and track usage of program memory. Generally this description relates to text files containing code corresponding to the syntax of a given programming language, such as C, C++, Java, and the like. However, a person of ordinary skill in the art would recognize that the above description may also apply to some binary or object code files. The compiler 112 also adds instrumentation markers to the instrumented executable 114 indicating region entry and exit points and generates code which makes clear the high-level variable expression which induced each memory reference. The process by which the compiler 112 generates the instrumented executable 114 is discussed in detail with respect to FIG. 3. The analysis program 116 then executes the instrumented executable 114 in a test bed environment. Test inputs representing a subset of all possible program data inputs are given to the instrumented executable 114 to create a set of data access statistics 118. The data access statistics 118 include a high level description for each data unit of each region in the instrumented executable 114. The composition of the data access statistics 118 is discussed in detail with respect to FIG. 2. The process by which the data access statistics 118 are created is discussed in further detail with respect to FIG. 4. The compiler 112 then uses the data access statistics 118 to generate a set of parallelization directives to be applied to the source code file 110. When the directives are added, the source code file 110 is transformed into a state which is optimized for execution in a parallel computing environment. The source code file 110 is recompiled with the set of directives to generate an optimized executable 120. The process by which the compiler 112 generates the optimized executable 120 is discussed in detail with respect to FIG. 3.

Figure 2:
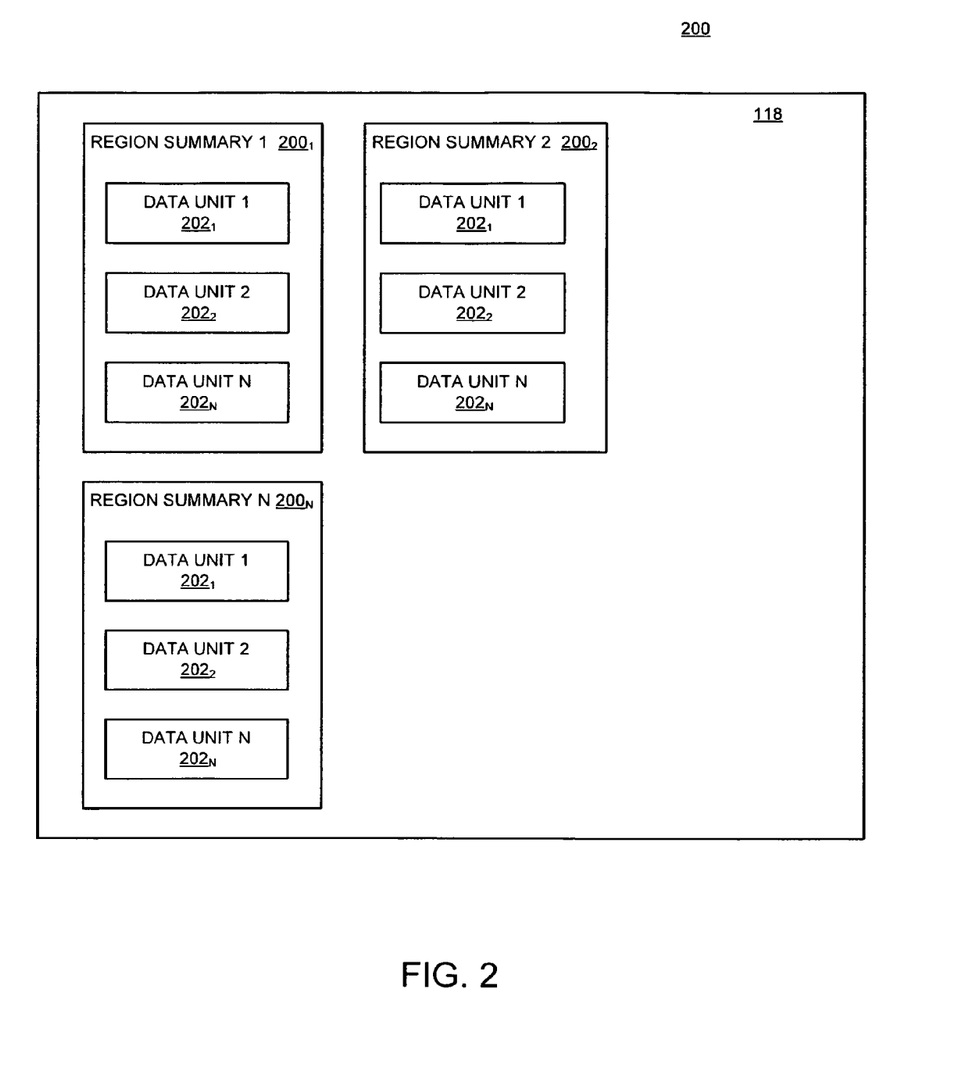
FIG. 2 is a block diagram depicting an exemplary set of data access statistics produced by the analysis program.

FIG. 2 is a block diagram of an exemplary set of data contained within the data access statistics 118. The data access statistics 118 comprise one or more region summaries 200 of the various programmatic regions contained within the source code file 110. The region summary 200 comprises memory access data for each data unit represented as units of data unit data 202, accessed while the region corresponding to the region summary 200 is executing.

Each set of data unit data 202 corresponds to a particular data unit (such as a variable, memory location, or the like) accessed during the region execution. In one embodiment, the data unit data 202 comprises two sets of four flags and a single state bit. The four flags correspond to Hoeflinger's four states of memory access:

No Access (NO) The data item has never been accessed.
Read Only (RO) The data item has not been written but has been read at least once.
Write First (WF) The first access to the data item was a write.
Read then Write (RW) The first access was a read; a subsequent access was a write.

The first set of four flags determines the memory access states for the data unit across a single iteration of the region, while the second set of four flags determines the memory access states for the data unit as a summary of all iterations of the region. At the end of a given region, the iteration data is merged with the summary data. The state bit for each data unit 202 is used to indicate whether a flow of values occurred across multiple iterations of the region.

Figure 3:
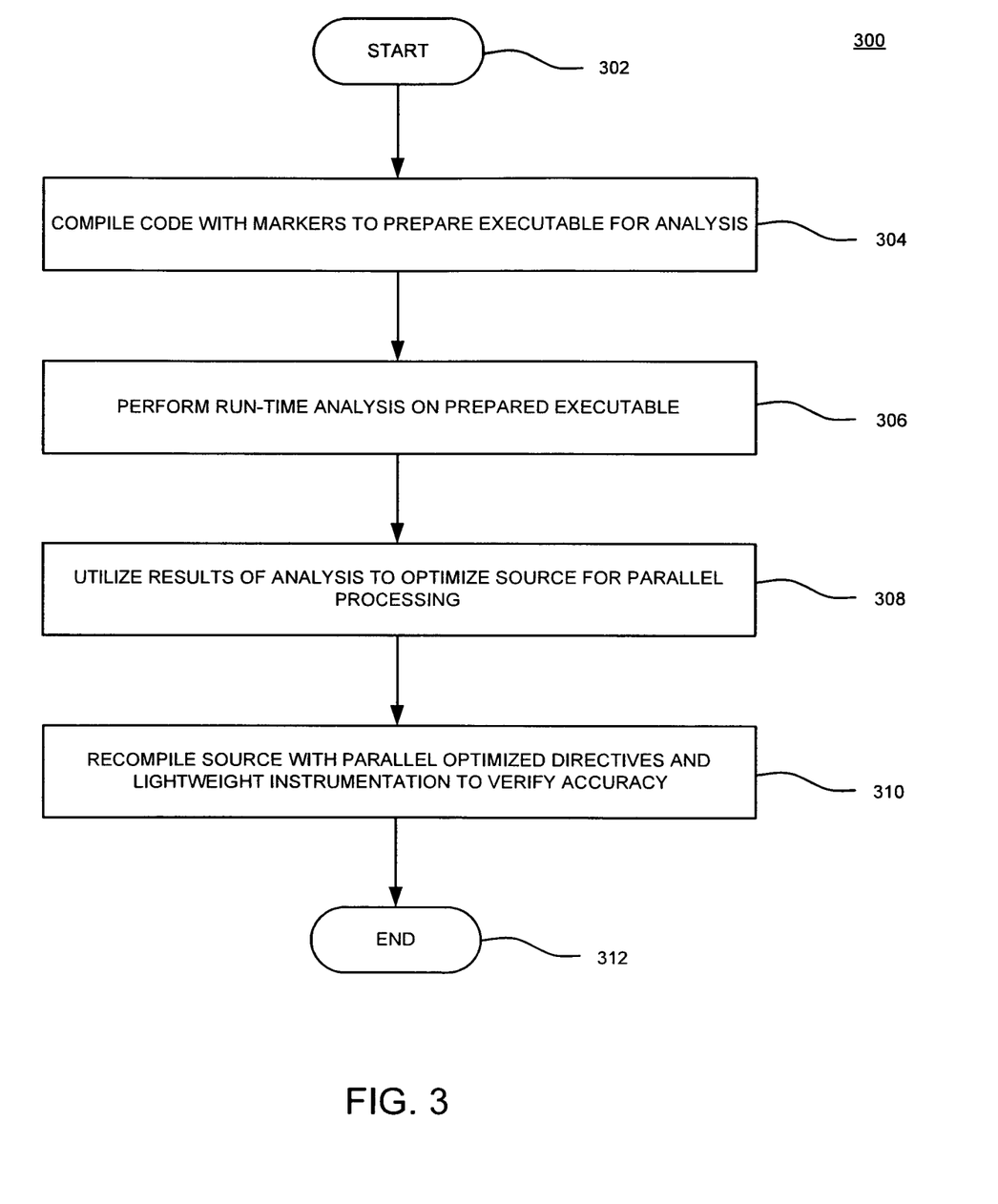
FIG. 3 is a flow diagram depicting a method of optimizing source code for parallel execution in accordance with an embodiment of the present invention.

FIG. 3 is a flow diagram depicting a method 300 of performing an embodiment of the present invention. The method 300 comprises four steps: compiling the source code with markers 304, performing analysis on the compiled source code 306, optimizing the source code with the results of the analysis 308, and recompiling the newly optimized source code with lightweight instrumentation and running the optimized code for verification 310.

The method begins at step 302. At this point, an application source code file 110 is about to be compiled and optimized for parallel processing via an embodiment of the present invention. At step 304, a compiler 112 compiles the source code file 110 to generate an instrumented executable 114.

The compiler 112 prepares the instrumented executable 114 for run-time analysis. Region entry, exit and iteration conditions are suitably marked in the instrumented executable 114. At runtime, this information is used to do careful bookkeeping to discover memory access patterns.

In some embodiments, all reads/writes to program variables are left unoptimized. The compiler 112 may store variables in registers, but this may obfuscate true memory access patterns. Therefore, all program variables are given the equivalent of the C "volatile" storage class specifier, so that references to them remain intact. However, in some embodiments, the analysis program 116 is capable of performing analysis on optimized code so this specifier is not necessary.

Figure 4:
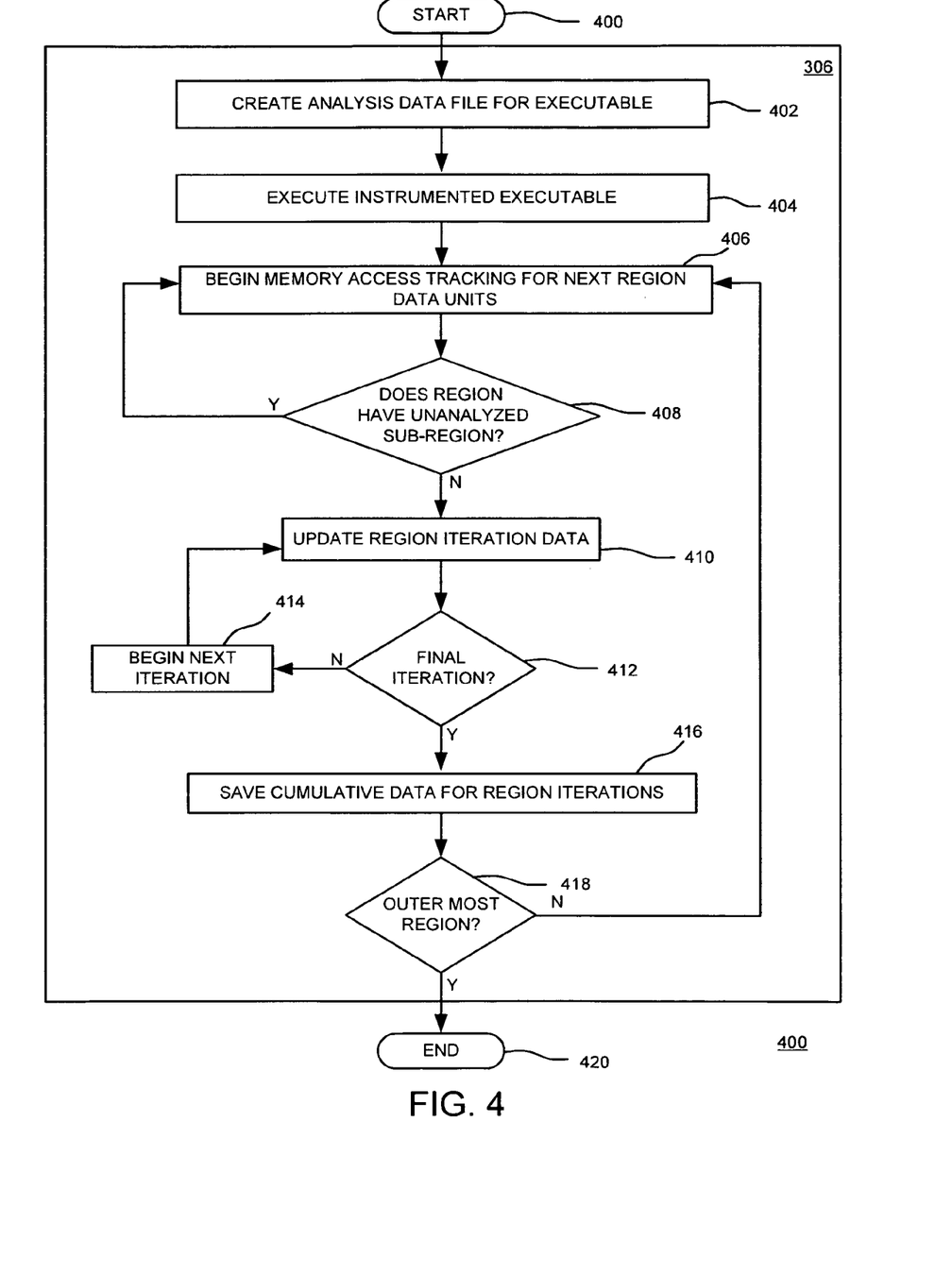
FIG. 4 is a flow diagram depicting a detailed embodiment of the analysis step of the method depicted in FIG. 3.

At step 306, the analysis program 116 executes to analyze the instrumented executable 114 at run-time. The analysis program 116 tracks the instrumentation added to the instrumented executable 114 to create a set of data access statistics 118. The instrumented executable 114 executes and the instrumentation embedded therein outputs data that is read by the analysis program 116. As the instrumented executable 114 runs for a given set of input, the memory execution profiles for each data unit within each region of the program are stored in the data access statistics 118. The method of analysis is described in further detail below as depicted in FIG. 4.

The analysis program 116 runs the instrumented executable 114 for a number of test iterations which correspond to "interesting" or "realistic" data input parameters. During the execution, the analysis program tracks and creates a set of data access statistics 118. The data access statistics 118 reflect the data gathered during the test iterations. The more test iterations are performed, the more reliable the gathered data is for predicting optimal parallelization. A minimum number of iterations corresponding to the most likely (and thus most interesting) data input sets are desired. The number of iterations that constitute such a set of inputs may vary from one application to another, depending upon the nature of the application. The data access statistics 118 of these runs are used to determine which, if any, regions within the source code file 110 may have parallel directives added.

At step 308, the analysis program 116 then adds the parallelization compiler directives to the source code file 110, based upon the data access statistics 118. The proper directives for each region are determined by the data access statistics for that region stored during analysis. In short, if there is no flow of values across region boundaries, then the regions are safely parallelizable. These flags and the state bit allow the analysis program 116 to determine if there has been data unit access across boundaries. While the data only measures the accesses associated with a given set of inputs, by using a large enough set of typical inputs it is possible to reasonably infer which regions may be presumably parallel.

In some embodiments, the analysis program 116 may also reorder program regions to provide task based parallelism. Given program regions may not be themselves parallelizable, but may be reordered to provide parallelism between regions. Consider the following example:

s1: for (i=0; i<1000; i++) A[i+1]=A[i];
s2: for (i=0; i<1000; i++) C[i+1]=C[i];
s3: for (i=0; i<1000; i++) B[i+1]=A[i]+B[i];
s4: for (i=0; i<1000; i++) D[i+1]=C[i]+D[i];

If all four loops {s1, s2, s3, s4} are analyzed separately, none are themselves parallelizable. Additionally, there are dependences between them such that s3 must follow s1 and s4 must follow s2. However, if the loops are reordered as s1, s3, s2, s4, then the first two could be a first region and the second two could be done as another independent region, thus producing region-based (or task) parallelism. The same reordering process could be applied to produce task parallelism within the statements of a loop as well.

At step 310, the source code file 110 is recompiled and executed with the newly added parallelization directives added at step 308.

The instrumentation described above generates the following types of data:

Dynamic Region nesting
Region execution counts for dynamic calling contexts
Detailed profile of the usage of each variable in every region Since the goal is to find the optimal presumably parallel regions, the analysis program 116 starts by looking at the most profitable regions. The analysis program 116 seeks to find a region cover, which is a maximal set of sibling regions with respect to the dynamic region nesting tree. Because the analysis program 116 seeks larger-grained regions, it prefers to select regions close to the top of the tree. If one of more of these top-level regions is not parallelizable, then the analysis program 116 recursively analyzes the next-level regions to find a region cover, since sometimes an inner region will be parallelizable despite being nested in a region which is not.

While the analysis that follows discusses iteration variables and other characteristics specific to program loops, a person of ordinary skill in the art of parallel computing would recognize that the analysis techniques described herein are also applicable for determining whether given program regions are parallel. In one embodiment, the programming region analyzed may comprise a loop. The analysis program 116 checks that this loop has exactly one iteration variable, and that this variable is not written to in any descendent loop. Also checked is that the induction variable is updated exactly once during each loop iteration. This may require summation of variable profiles generated from instances of the loop reached dynamically through different ancestor nodes. For reduction variables, the analysis program 116 checks that the updates are all using a single compatible reduction operator. All of this checking must be careful of recursive cycles which can cause the analysis to loop indefinitely.

The data-sharing attributes can be inferred in the analysis using the following rules:

Shared A variable is shared if it is referenced by more than one iteration and it is not read-only.
Private A variable is private if it is read-only or if each data element is accessed by at most one iteration.
Lastprivate A variable is lastprivate if it is private and the value is read outside of the region before becoming overwritten.
Firstprivate A variable is firstprivate if it is private and read before being written inside the region.

The analysis program 116 has the information needed to determine if a variable is firstprivate, since this will apply exactly when it is not write-first. More subtle is the lastprivate condition, which requires the knowledge of whether the value computed within a region is ever used outside of the region.

This is inferred by keeping a flag which records for each data unit of each variable of each region that the first access to the variable after the region was a covering write, meaning that it overwrote the entire existing value. If the variable is ever read and the flag is not set, then the variable is lastprivate.

To exploit presumably parallel regions, the it must be possible to detect a region which has been erroneously parallelized with respect to a particular program input. This can be performed by comparing actual memory access behavior to the profile contained within the data access statistics 118 the analysis program 116 previously computed using the set of test suite in step 206. There are a number of conditions which must be checked:

No variable is accessed except those included in the summary sets for this region.
No variable in the set of read-only data units is never written to.
No variable in the set of write-first data units is read before being written in any region iteration.
Iteration variables are always updated using the same operation and with the same increment.
Reduction variables are always read before being written, and the update is always with the correct reduction type.

As discussed above, a memory reference inside an aggregate may be very expensive to check at run-time, especially if nothing is known about the base of the reference. In most cases, the analysis program 116 can disambiguate either statically or with a very quick and cheap runtime test. It is important to use as large a granularity as the data permits to keep verification overhead small. That is, the analysis program 116 needs at most one verification bit for each data item, not one bit for each data byte as needed during instrumentation for parallel region discovery. This keeps the verification flag overhead low and is possible in either hardware or software.

In some embodiments, it is possible to build a lightweight "program trap" into the compiled and optimized executable. This program trap may monitor the memory access patterns of the executable for violations of the assumptions made during optimization. The program trap may report illegal parallelization to a separate analysis/data gathering process, to the operating system itself, or to an output file. This program trap advantageously allows the executable to perform self-tests at run-time without the need to execute in a test environment, and without the additional processing overhead associated with such.

FIG. 4 depicts a detailed flow diagram of the analysis step 206. The analysis begins at step 400, when the instrumented executable 114 has been created by the compiler 112. At step 402, the analysis program 116 generates a file to hold the data access statistics 118, to be populated with memory access data for the program regions. At step 404, the analysis program 116 executes the instrumented executable 114.

At step 406, the analysis program 116 analyzes the outermost region. At step 408, the analysis program 116 proceeds along the natural execution path of the instrumented executable 114 with respect to the given program input within the currently analyzed region. The analysis program 116 saves the memory access statistics for each program region as the regions are executed. The analysis program 116 continues its analysis as the region and sub-regions therein are executed, starting again at 406 as the path of execution leaves the region. The process continues recursively as regions accessed during execution are analyzed. The data for the unanalyzed regions is measured and saved at step 410, for each iteration of the region. At the end of an iteration, if the region is not in its final iteration, as determined at step 412, the data for the current iteration is merged with the summary region data at step 414 and the next iteration is begun.

When the region is finished executing at step 416, the data unit memory access data for the region is sent back to the covering region, to be merged with the data corresponding to the current iteration of the covering region. This process continues recursively until the outermost region is reached at step 418. When the analysis is complete for all regions at step 420, the results are ready for analysis to determine the proper parallelization directives.

The analysis program 116 tracks the instrumented executable by using the markers which the compiler 112 inserts into the program. In this manner, it is possible to determine which directives must be assigned to each region to ensure proper parallel processing. All regions are initially presumed to be parallel until proved otherwise by analysis of the data access statistics 116 on a region-by-region basis. The analysis program 116 may use functions as region boundaries because it is easy to flag region entry and exit points as functions are entered and exited. However, loops have no such natural markers and are difficult to detect until after the first iteration. To avoid a situation in which the first iteration of a loop is (non-intuitively) combined into the profile of the loop's parent region, the compiler 112 inserts special markers that clearly demarcate loop entry, exit and decision points.

There are three markers inserted by the compiler 112, each of which will cause the manipulation of different versions of the region data:

Region Entry When a region starts, a new memory context is pushed onto a stack. This context contains both summary memory and current iteration memory for each memory location. The analysis program 116 update an iteration memory state $M_i(v)$ for a variable v to the updated state $M_i(v)'$ using the following function:

$$M_s(v)' = \begin{cases} RO & \text{if } v \text{ read and } M_i(v) \in \{NO, RO\} \\ M_i(v) & \text{if } v \ M_i(v) \in \{WF, RW\} \\ WF & \text{if } v \text{ written and } M_i(v) \in \{NO, WF\} \\ RW & \text{if } v \text{ written and } M_i(v) \in \{RO, RW\} \end{cases}$$

Region Iteration When a region iterates, the iteration memory must be merged with the region summary memory. The analysis program 116 creates the new region summary memory state, $M_s(v)'$, using the previous value $M_s(v)$ joined with $M_i(v)$ as follows:

$$M_s(v)' = \begin{cases} M_i(v) & \text{if } M_s(v) = NO \\ M_s(v) & \text{if } M_s(v) \in \{WF, M_i(v)\} \\ RW & \text{otherwise} \end{cases}$$

Region Exit When a region ends, the region summary memory state of the exiting region must be merged with the iteration memory state of the region which was the previous top of the stack. Furthermore, the summary region state for aggregates, which holds a unit of state for each component data units, must be conservatively condensed to a single unit of state.

Besides the two versions of the four states of memory activity kept for each data unit, additional state data is kept to help determine whether any real value flow happened across different iterations. It must be realized that having a variable read before it is written in a particular iteration does not necessarily imply a flow dependence. There are a number of other reasons why this behavior may be observed:

The variable in question is an induction variable.
The variable in question is a reduction variable.
The variable part written in this iteration is not read in any later iteration.

This extra bit stores whether a particular data unit carried an actual value from an earlier iteration to a later one. Although it is helpful to think of the analysis as producing an access type result for the cross product of each program region with each program variable, in practice such a matrix would be very sparse because only a small subset of program variables are accessed within any given region. Moreover, since a variable which is allocated and freed within a single region iteration cannot create dependence between region iterations, it is irrelevant for the region in question—such dependence is said to be local to the region.

In order to perform the later verification efficiently, it is important to maintain understanding of memory accesses at a fairly high level. As discussed above, it is easy to prevent the complier 112 from renaming program variables into compiler temporaries or machine registers across program statements by making all variables semantically volatile. Volatility implies that the variable value will be loaded before the statement on read and stored after the statement on write, but does not prevent temporaries from replacing the variable during statement execution, since some expressions, especially array accesses, still require the use of some temporaries to evaluate.

In some embodiments, the Dynamic Binary Instrumentation (DBI) framework makes it easy to relate temporaries with the original variables as long as they are defined within the current basic block. Judicious filling and closing of DBI basic blocks at program source-level statement boundaries can help, but a conditional expression or function call could force intermediate computations onto the stack, creating a tracking nightmare. In this case, the compiler 112 can help by inserting artificial statement termination semantics around the part of the statement containing the control flow.

In the object code, each memory access consists of a base+ index x scale+offset, although this may be garbled by compiler optimizations which may substitute cheaper but more obscure operations to produce the address. This information, together with compiler symbolic debugging information, can be used to identify each memory access precisely. There are three levels at which memory references can be understood:

Static The base of the reference is constant or relative to the stack frame and both index and offset are constant.
Easy Dynamic The base is constant or relative to the stack frame; the index and/or offset are unknown statically.
Hard Dynamic The base is unknown statically.

The goal of exploiting the regions efficiently and reliably is most hampered by heap memory, which falls into the category of Hard Dynamic unless care is taken to understand the profile of the heap in the application.

To understand fully how heap memory is used, it is necessary to track it from allocation through de-allocation, and to note which program variables are expected to be pointing to blocks of memory allocated through specific chains of functions calls which terminate in an allocation.

In order to learn how newly allocated memory is passed around in the application, the analysis program 116 tracks heap pointers as they are returned from allocation functions.

These return values may be passed by return value or by being assigned to an address in the caller stack frame, or directly assigned to a global variable. The allocation chain is terminated when a function which has allocated memory or had newly allocated memory assigned to a variable in its call frame does not return that memory to a caller. At verification time, certain memory locations will likely hold heap values returned by specific allocation call chains.

Induction variables are written in the same manner each time, and often with exactly the same instruction, on each loop iteration. They may be read freely at any time. The analysis program 116 identifies induction variables by observing for each variable a) whether the number of updates per loop iteration is exactly one, and b) whether disassembling the instruction sequence which terminated with a write to the variable to determine that they are consistent with an induction variable style update. In case writes to the variable occurred at multiple points in the instruction stream, the checks need to ensure that each update is consistent with every other update.

Reduction variables have a very specific usage pattern: they are never really read or written, but rather updated. The analysis program 116 observes that a variable update comes at run-time as a read followed by a write, with a computation in-between. In the case that a reduction variable is accumulated with other variables, there may be a small number of reads, but no writes, coming in-between the read and write of the reduction variable. Therefore, the analysis program 116 keeps track of all reads-since the last write. When a write occurs, if the same address had a read since the last write, then the address could be that of a reduction variable, otherwise it is certainly not. Furthermore, when the write occurs the analysis program 116 determines that every other variable read since the last write is not a reduction variable. When a read occurs, if the same address had another read since the last write, then that address certainly does not belong to a reduction variable.

OS and library calls are not traced into because they have known semantics with respect to parallelization. This helps analysis efficiency. Additionally, it prevents a situation where an object code compiled elsewhere may interrupt the dynamic binary instrumentation. If the program uses shared libraries with ELF (Executable Linkage Format) PLT (Procedure Linkage Table) redirection, it is easy to detect when a program calls into a shared library, since the call is indirect through a specially flagged section of memory.

To see how a region cover is determined, consider the following program text:

```
      int X[10] [10] [10], Y[10] [10], 2[10] [10];
      int main( )
      {
          int i, j, k;
11:       for ( i = 0; i < 10; i ++ )
          {
12:           for ( j = 0; j < 10; j++ )
13:               for ( k = 0; k < 10; k++ )
                      X[i] [j] [k] = 0;
14:           for ( j = 0; j < 10; j++ )
                  Z[i] [j] = 0;
          }
16:       for ( i = 0; i < 10; i++ )
17:           for ( j = 0; j < 10; j++ )
                  Y[i] [j] = 0;
          return 0;
      }
```

The most advantageous regions to parallelize are obviously the outmost regions 11 and 16. If one of these should fail to parallelize, the analysis program 116 must recursively examine its children to use those as candidates in its place. In general, the best region cover is the highest cut that can be made through the dynamic region nesting tree of the program, where the analysis program 116 considers immediate subregions of each region which is itself unparallelizable. Therefore, in this example, the analysis program 116 would consider parallelizing 12 and 14 instead of 11 and 17 would be our second choice after 16.

While the foregoing is directed to embodiments of the present invention, other and further embodiments of the invention may be devised without departing from the basic scope thereof, and the scope thereof is determined by the claims that follow.

The invention claimed is:

1. A method for optimizing source code for use in a parallel computing environment comprising:
   compiling a source code file with a set of instrumentation to create an instrumented executable;
   executing the instrumented executable with a set of potential data inputs to track data unit memory accesses across one or more program regions to create a set of data access statistics;
   collecting the data access statistics by a method comprising the steps of:
   a) cutting dynamic basic blocks at source statement boundaries;
   b) collecting dynamic region nesting information;
   c) collecting execution and iteration count information;
   d) collecting data indicating whether each data unit, region, and referenced variable is read-only, write-first, or read-write;
   e) tracking global data, allocation, and deallocation of stack frames;
   f) learning which types of heap memory each program pointer is likely to point to;
   g) detecting whether there is a flow of values between region iterations;
   h) detecting whether there is a flow of values into or out of each region context; and
   i) detecting whether a variable is accessed according to a reduction pattern; and
   j) utilizing the data access statistics to add a set of parallel processing directives to the source code file to optimize the source code file for execution in a parallel computing environment.

2. The method of claim 1, wherein the program regions are loops.

3. The method of claim 1, further comprising:
   verifying the set of parallel directives added to the source code by a method comprising:
   executing an optimized executable containing the set of parallel directives; and
   comparing the memory accesses of the optimized executable with a memory access profile derived from the data access statistics.

4. The method of claim 3, wherein the verifiying step further comprises using a program trap built into the optimized executable.

5. The method of claim 1, wherein the parallel processing directives conform to the OpenMP parallel processing directives standard.

6. The method of claim 1, further comprising deciding whether a candidate region would be useful to parallelize.

7. The method of claim 6, wherein the deciding step further comprises:
   a) determining the execution time of the region versus the total program execution time;
   b) determining whether any parent-child relationship among the regions would give rise to nested parallelism; and
   c) determining if the grain of the region is coarse enough to justify nested parallelism.

8. The method of claim 1, wherein the utilizing step further comprises reordering program regions of the source code file.

9. The method of claim 1, wherein the compiling step further comprises:
   a) changing reference semantics of all variables to volatile;
   b) inserting object code markers which identify region enter, exit, and decision points; and
   c) splitting logical source code statements to inhibit the use of compiler temporaries between basic blocks.

10. A non-transitory computer readable storage medium comprising software that, when executed by a processor, causes the processor to perform a method comprising:
   compiling a source code file with instrumentation to create an instrumented executable;
   executing the instrumented executable with a subset of potential data inputs to track memory accesses across one or more program regions to create a set of data access statistics;
   collecting the data access statistics by a method comprising the steps of:
   a) cutting dynamic basic blocks at source statement boundaries;
   b) collecting dynamic region nesting information;
   c) collecting execution and iteration count information;
   d) collecting data indicating whether each data unit, region, and referenced variable is read-only, write-first, or read-write;
   e) tracking global data, allocation, and deallocation of stack frames;
   f) learning which types of heap memory each program pointer is likely to point to;
   g) detecting whether there is a flow of values between iterations;
   h) detecting whether there is a flow of values into or out of each region context; and
   i) detecting whether a variable is accessed according to a reduction pattern; and
   j) utilizing the data access statistics to add a set of parallel processing directives to the source code file to optimize the source code file for execution in a parallel computing environment.

11. The non-transitory computer readable storage medium of claim 10 wherein the program regions are loops.

12. The non-transitory computer readable storage medium of claim 10, wherein the method executed by the processor further comprises verifying that no program regions have been improperly parallelized by a method comprising:
   executing an optimized executable containing the set of parallel processing directives; and
   comparing data accesses of the optimized executable with a memory access profile derived from the set of data access statistics.

13. The non-transitory computer readable storage medium of claim 12, wherein the verification is performed by a program trap built into the optimized executable.

14. The non-transitory computer readable storage medium of claim 10, wherein the parallel processing directives conform to the OpenMP parallel processing directives standard.

15. The non-transitory computer readable storage medium of claim 10, wherein the method further comprises determining if a candidate region is useful to parallelize.

16. The non-transitory computer readable storage medium of claim 15, wherein the determining step further comprises:
   a) determining the execution time of the region versus the total program execution time;
   b) determining whether any parent-child relationship among the regions would give rise to nested parallelism; and
   c) determining if the grain of the region is coarse enough to justify nested parallelism.

17. The non-transitory computer readable storage medium of claim 10, wherein the utilizing step further comprises reordering program regions of the source code file.

18. A method for optimizing source code for use in a parallel computing environment comprising:
   compiling a source code file with a set of instrumentation to create an instrumented executable;
   executing the instrumented executable with a set of potential data inputs to track data unit memory accesses across one or more program regions to create a set of data access statistics; and
   utilizing the data access statistics to add a set of parallel processing directives to the source code file to optimize the source code file for execution in a parallel computing environment;
   wherein the utilizing step comprises:
   a) finding an outermost region cover;
   b) deciding which of the regions in the outermost region cover are presumably parallelizable;
   c) recursively finding an inner region cover for each unparallelizable region in the outermost region cover;
   d) deciding which variables could be induction variables by matching a number and a manner of updates with a region execution count;
   e) deciding which variables could be reduction variables by examining a manner of variable updates;
   f) deciding which variables should be privatized and if the variables are privatized, whether the variables need lastprivate or firstprivate semantics; and
   g) adding parallelization directives to the source code file based on the results of steps a) through f).

19. A non-transitory computer readable storage medium comprising software that, when executed by a processor, causes the processor to perform a method comprising:
   compiling a source code file with instrumentation to create an instrumented executable;
   executing the instrumented executable with a subset of potential data inputs to track memory accesses across one or more program regions to create a set of data access statistics; and
   utilizing the data access statistics to add a set of parallel processing directives to the source code file to optimize the source code file for execution in a parallel computing environment wherein the utilizing step further comprises:
   a) finding the outermost region cover;
   b) deciding which of the regions in the outermost region cover are presumably parallelizable;
   c) recursively finding an inner region cover for each unparallelizable region in the outer cover;

d) deciding which variables could be induction variables by matching the number and manner of updates with the region execution count;
e) deciding which variables could be reduction variables by examining the manner of variable updates;
f) deciding which variables should be privatized and whether they need lastprivate or firstprivate semantics; and
g) adding parallelization directives to the source code file based on the results of steps a) through f).

* * * * *